United States Patent
Xu et al.

(10) Patent No.: US 11,444,880 B2
(45) Date of Patent: Sep. 13, 2022

(54) TRAFFIC CONTROL METHOD AND RELATED APPARATUS

(71) Applicant: HUAWEI TECHNOLOGIES CO., LTD., Guangdong (CN)

(72) Inventors: Jinchuan Xu, Shenzhen (CN); Jiajie Tan, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 2 days.

(21) Appl. No.: 17/072,695

(22) Filed: Oct. 16, 2020

(65) Prior Publication Data

US 2021/0036960 A1 Feb. 4, 2021

Related U.S. Application Data

(63) Continuation of application No. PCT/CN2019/082346, filed on Apr. 12, 2019.

(30) Foreign Application Priority Data

Apr. 18, 2018 (CN) .......................... 201810349910.9

(51) Int. Cl.
*H04L 12/851* (2013.01)
*H04L 47/2483* (2022.01)
(Continued)

(52) U.S. Cl.
CPC .......... *H04L 47/2483* (2013.01); *H04L 43/10* (2013.01); *H04L 47/12* (2013.01); *H04L 47/2466* (2013.01)

(58) Field of Classification Search
None
See application file for complete search history.

(56) References Cited

U.S. PATENT DOCUMENTS 6,044,406 A * 3/2000 Barkey .............. H04Q 11/0478
370/231
6,990,073 B1 * 1/2006 Sandoval ................ H04L 47/10
370/232
(Continued)

FOREIGN PATENT DOCUMENTS

CN 102355462 A 2/2012
CN 104052653 A 9/2014
(Continued)

OTHER PUBLICATIONS

Oasis, "MQTT Version 5.0—Committee Specification Draft 02 /Public Review Draft 02", dated Oct. 26, 2017, total 137 pages.
(Continued)

*Primary Examiner* — Eunsook Choi
(74) *Attorney, Agent, or Firm* — Womble Bond Dickinson (US) LLP (57) ABSTRACT

This disclosure describes a traffic control method and a related apparatus. When receiving a publish packet sent by a client, a serving end queries a window value of a flow control window of the client, and compares the window value with a preset window threshold. The serving end rejects the publish packet when the window value is equal to the window threshold, or when the window value is greater than the window threshold, decreases the window value by a preset value, and processes the publish packet. Thus, the problem that the serving end cannot process, in time, a message sent by the client because the client sends the message too fast when the message is transmitted between the client and the serving end, can be avoided so that communication can be normally performed.

20 Claims, 4 Drawing Sheets

(51) Int. Cl.
*H04L 43/10* (2022.01)
*H04L 47/12* (2022.01)
*H04L 47/2466* (2022.01)
*H04L 12/26* (2006.01)

(56) References Cited

U.S. PATENT DOCUMENTS

| | | | |
|---|---|---|---|
| 11,036,368 | B1 | 6/2021 | Al Majid et al. |
| 2001/0050913 | A1* | 12/2001 | Chen ............... H04L 12/5602 370/360 |
| 2010/0329114 | A1 | 12/2010 | Chesson |
| 2016/0248871 | A1 | 8/2016 | Seed et al. |
| 2016/0269305 | A1* | 9/2016 | Sreeramoju ............ H04L 47/32 |
| 2018/0123965 | A1* | 5/2018 | Lee .................... H04L 47/6275 |
| 2018/0167476 | A1* | 6/2018 | Hoffner ................. H04L 67/26 |
| 2018/0270310 | A1* | 9/2018 | Venkatesan ......... H04L 12/2836 |
| 2019/0342223 | A1 | 11/2019 | Dhanabalan et al. |

FOREIGN PATENT DOCUMENTS

| | | |
|---|---|---|
| CN | 106254468 A | 12/2016 |
| UA | 80102 C2 | 8/2007 |

OTHER PUBLICATIONS

Yujie Zhang et al.,"Implementation of file transfer method for Internet of things system based on MQTT",Journal of Shaanxi University of Science and Technology,vol. 36 No. 1,Feb. 2018,total 7 pages.

Oasis,"MQTT Version 5.0—Committee Specification Draft 01 /Public Review Draft 01",dated Jul. 13, 2017,total 144 pages.

Yue Ma et al.,"Application of MQTT Protocol to Instant Communicationin Mobile Internet",computer system application,2016 vol. 25, Issue 3,total 7 pages.

Oasis,"MQTT Version 5.0—MQTT Version 5.0—Working Draft 17",dated Oct. 19, 2017,total 139 pages.

Ed Briggs,"Flow Control Issue 257",dated Aug. 11, 2016,total 13 pages.

* cited by examiner

TRAFFIC CONTROL METHOD AND RELATED APPARATUS

CROSS-REFERENCE TO RELATED DISCLOSURES

This application is a continuation of International Application No. PCT/CN2019/082346, filed on Apr. 12, 2019, which claims priority to Chinese Patent Application No. 201810349910.9, filed on Apr. 18, 2018. The disclosures of the aforementioned disclosures are hereby incorporated by reference in their entireties.

TECHNICAL FIELD

This disclosure relates to the field of communications technologies, and in particular, to a traffic control method and a related apparatus.

BACKGROUND

The Message Queue Telemetry Transport (MQTT) protocol is a message transmission protocol of a client-serving end architecture in a publish/subscribe mode, and has features such as being light, open, easy, normalized, and easy to implement. The MQTT protocol may be applicable to various scenarios, for example, machine to machine communication and an Internet of Things (IoT) environment.

The MQTT protocol is operated on the Transmission Control Protocol (TCP)/Internet Protocol (IP), or another network connection providing an ordered, reliable, and both-way connection. However, currently, because the MQTT protocol does not have a traffic control (e.g., flow control) mechanism, when a message is transmitted between a client and a serving end, if a sender sends the message too fast, a receiver cannot process, in time, the message sent by the sender in a message receiving process because of a processing capability restriction, a message congestion, and the like. Consequently, communication cannot be normally performed between the client and the serving end.

SUMMARY

This disclosure provides a traffic control method and a related apparatus to address the problem that when a message is transmitted between a client and a serving end, if a sender sends the message too fast, a receiver cannot process, in time, the message sent by the sender. According to the embodiments discussed herein, the aforementioned problem can be avoided, so that communication can be normally performed between the client and the serving end.

According to a first aspect, this disclosure provides a traffic control method. A serving end queries a window value of a flow control window of a client when receiving a publish packet sent by the client. The serving end compares the window value with a preset window threshold. The serving end rejects the publish packet when the window value is equal to the window threshold. When the window value is greater than the window threshold, the serving end decreases the window value by a preset value, and processes the publish packet.

In this embodiment of this disclosure, the serving end stores the window value of the flow control window of the client. The serving end may control, through the window value of the flow control window of the client, receiving the publish packet sent by the client, to implement traffic control of the client. Therefore, a problem that the serving end cannot process a packet in time because the client sends the packet too fast or the client sends an excessive quantity of packets can be avoided, so that communication can be normally performed between the client and the serving end.

With reference to the first aspect, in a first possible embodiment of the first aspect, the method further includes: receiving, by the serving end, a connection request packet sent by the client, where the connection request packet includes a first initial value of the flow control window of the client and a first recovery period of the flow control window of the client, and the first recovery period indicates a period in which the flow control window of the client recovers to the first initial value; when the first initial value and the first recovery period satisfy a preset condition, storing, by the serving end, the first initial value and the first recovery period, and sending a first connection acknowledgment packet to the client, where the first connection acknowledgment packet includes the first initial value and the first recovery period, the first connection acknowledgment packet indicates that an initial value of the flow control window of the client is the first initial value, and a recovery period of the flow control window of the client is the first recovery period; determining, by the serving end, a second initial value of the flow control window of the client and a second recovery period of the flow control window of the client when the first initial value and the first recovery period do not satisfy the preset condition; storing, by the serving end, the second initial value and the second recovery period; and sending, by the serving end, a second connection acknowledgment packet to the client, where the second connection acknowledgment packet includes the second initial value and the second recovery period, the second connection acknowledgment packet indicates that the initial value of the flow control window of the client is the second initial value, and the recovery period of the flow control window of the client is the second recovery period.

With reference to the first possible embodiment of the first aspect, in a second possible embodiment of the first aspect, after the sending, by the serving end, a first connection acknowledgment packet to the client, the method further includes: setting, by the serving end, a value of the flow control window of the client to the first initial value based on the first recovery period.

With reference to the first possible embodiment of the first aspect or the second possible embodiment of the first aspect, in a third possible embodiment of the first aspect, the method further includes: receiving, by the serving end, a first heartbeat message sent by the client, where the first heartbeat message includes a third initial value of the flow control window of the client and a third recovery period of the flow control window of the client, the third initial value is used to update the first initial value, and the third recovery period is used to update the first recovery period; when the third initial value and the third recovery period satisfy the preset condition, storing, by the serving end, the third initial value and the third recovery period, and sending a second heartbeat message to the client, where the second heartbeat message includes the third initial value and the third recovery period; and when the third initial value and the third recovery period do not satisfy the preset condition, determining, by the serving end, a fourth initial value and a fourth recovery period, and sending a third heartbeat message to the client, where the third heartbeat message includes the fourth initial value and the fourth recovery period.

With reference to the first possible embodiment of the first aspect, in a fourth possible embodiment of the first aspect, after the sending, by the serving end, a second connection acknowledgment packet to the client, the method further includes: setting, by the serving end, a value of the flow control window of the client to the second initial value based on the second recovery period.

According to a second aspect, this disclosure provides a traffic control method. When needing to send a publish packet to a serving end, a client queries a window value of a flow control window of the client, and compares the window value with a preset window threshold. The client pauses sending the publish packet to the serving end when the window value is equal to the window threshold; or when the window value is greater than the window threshold, the client decreases the window value by a preset value, and sends the publish packet to the serving end.

In this embodiment of this disclosure, the client stores the window value of the flow control window of the client and may control, through the window value, whether to send the publish packet to the serving end, to implement traffic control of the client. Therefore, a problem that the serving end cannot process a packet in time because the client sends the packet too fast or the client sends an excessive quantity of packets can be avoided, so that communication can be normally performed between the client and the serving end.

With reference to the second aspect, in a first possible embodiment of the second aspect, the client sends a connection request packet to the serving end, where the connection request packet includes a first initial value of the flow control window of the client and a first recovery period of the flow control window of the client, and the first recovery period indicates a period in which the flow control window of the client recovers to the first initial value; the client receives a first connection acknowledgment packet sent by the serving end, where the first connection acknowledgment packet includes the first initial value and the first recovery period, and the first connection acknowledgment packet indicates that an initial value of the flow control window of the client is the first initial value, and a recovery period of the flow control window of the client is the first recovery period;

the client determines the first initial value as the initial value of the flow control window of the client, and the first recovery period as the recovery period of the flow control window of the client; and the client stores the first initial value and the first recovery period.

With reference to the first possible embodiment of the second aspect, in a second possible embodiment of the second aspect, after the storing, by the client, the first initial value and the first recovery period, the method further includes: setting, by the client, a value of the flow control window of the client to the first initial value based on the first recovery period.

With reference to the first possible embodiment of the second aspect or the second possible embodiment of the second aspect, in a third possible embodiment of the second aspect, the method further includes: sending, by the client, a first heartbeat message to the serving end, where the first heartbeat message includes a third initial value of the flow control window of the client and a third recovery period of the flow control window of the client, the third initial value is used to update the first initial value, and the third recovery period is used to update the first recovery period; when receiving a second heartbeat message including the third initial value and the third recovery period, updating, by the client, the first initial value based on the third initial value, and updating the first recovery period based on the third recovery period, where the second heartbeat message is sent when the serving end accepts the third initial value and the third recovery period; and when receiving a third heartbeat message including a fourth initial value and a fourth recovery period, updating, by the client, the first initial value based on the fourth initial value, and updating the first recovery period based on the fourth recovery period, where the third heartbeat message is sent when the serving end does not accept the third initial value and the third recovery period.

With reference to the second aspect, in a fourth possible embodiment of the second aspect, the method further includes: sending, by the client, a connection request packet to the serving end, where the connection request packet includes a first initial value of the flow control window of the client and a first recovery period of the flow control window of the client, and the first recovery period indicates a period in which the flow control window of the client recovers to the first initial value; receiving, by the client, a second connection acknowledgment packet sent by the serving end, where the second connection acknowledgment packet includes a second initial value and a second recovery period, the second connection acknowledgment packet indicates that an initial value of the flow control window of the client is the second initial value, and a recovery period of the flow control window of the client is the second recovery period; determining, by the client, the second initial value as the initial value of the flow control window of the client, and the second recovery period as the recovery period of the flow control window of the client; and storing, by the client, the second initial value and the second recovery period.

With reference to the fourth possible embodiment of the second aspect, in a fifth possible embodiment of the second aspect, after the storing, by the client, the second initial value and the second recovery period, the method further includes:

setting, by the client, a value of the flow control window of the client to the second initial value based on the second recovery period.

According to a third aspect, this disclosure provides a traffic control apparatus, including functional units configured to implement the method in the first aspect and the embodiments of the first aspect of this disclosure.

According to a fourth aspect, this disclosure provides a traffic control apparatus, including functional units configured to implement the method in the second aspect and the embodiments of the second aspect of this disclosure.

According to a fifth aspect, this disclosure provides a traffic control system, including the traffic control apparatus according to the third aspect or any embodiment of the third aspect and the traffic control apparatus according to the fourth aspect or any embodiment of the fourth aspect.

According to a sixth aspect, this disclosure provides a traffic control device, including a processor and a memory, where the memory is configured to store computer program code, where the computer program code includes an instruction; and the processor is configured to execute the instruction, so that the traffic control device is enabled to implement the traffic control method according to the first aspect or any embodiment of the first aspect.

According to a seventh aspect, this disclosure provides another traffic control device, including a processor and a memory, where the memory is configured to store computer program code, where the computer program code includes an instruction; and the processor is configured to execute the instruction, so that the traffic control device is enabled to perform the traffic control method according to the second aspect or any embodiment of the second aspect.

According to an eighth aspect, this disclosure provides a computer readable storage medium. The computer readable storage medium stores an instruction. When the instruction runs on a computer, the computer is enabled to perform the traffic control method according to the first aspect or any embodiment of the first aspect.

According to a ninth aspect, this disclosure provides another computer readable storage medium. The computer readable storage medium stores an instruction. When the instruction runs on a computer, the computer is enabled to perform the traffic control method according to the second aspect or any embodiment of the second aspect.

BRIEF DESCRIPTION OF DRAWINGS

To describe the technical solutions of the embodiments of this disclosure more clearly, the following briefly describes the accompanying drawings required for describing the embodiments of this disclosure.

DESCRIPTION OF EMBODIMENTS

When there is no conflict, the embodiments in this disclosure and different features in the embodiments may be combined with each other.

Figure 1:
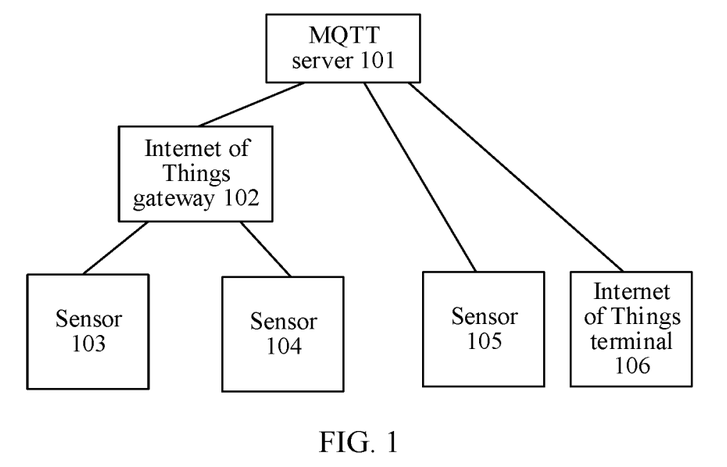
FIG. 1 is a schematic diagram of a network architecture according to an embodiment of this disclosure.

The embodiments of this disclosure are applicable to a network architecture in which data is transmitted between a serving end and a client through the MQTT protocol. FIG. 1 is a schematic diagram of a network architecture to which an embodiment of this disclosure is applicable. As shown in FIG. 1, an MQTT server 101 is used as a serving end, and a sensor 103, a sensor 104, a sensor 105, and an Internet of Things terminal 106 are used as a client. The client may be directly connected to the serving end, for example, the sensor 105 and the Internet of Things terminal 106, and the two devices are directly connected to the MQTT server 101. The client may further be connected to the serving end, for example, the sensor 103 and the sensor 104, through a gateway, and the sensor 103 and the sensor 104 are connected to the MQTT server 101 through an Internet of Things gateway 102. The Internet of Things gateway 102 is an access gateway of the sensor 103 and the sensor 104, may be an MQTT server in a bridge mode, and may also be an MQTT client. The sensor 103, the sensor 104, the sensor 105, and the Internet of Things terminal 106 are configured to: collect data, and send the data to the MQTT server 101 through the MQTT protocol. The MQTT server 101 processes the data after receiving the data.

In the embodiments of this disclosure, to perform flow control between the client and the serving end, the serving end and the client both set a flow control window of the client. An initial value of the flow control window may indicate a quantity of packets that can be sent by the client in a period, a size of a packet that can be received by the client in a period, or the like. After a packet sent by the client is received by the serving end, a window value that corresponds to the client and that is of the flow control window needs to be decreased by a preset value, to indicate that an accurate value of the packet sent by the client can be received in the period. After the client sends a packet, the window value of the flow control window needs to be decreased by a preset value, to indicate that an accurate value of the packet can be sent in the period. If the initial value of the flow control window may indicate the quantity of packets that can be sent by the client in a period, the preset value is usually set to 1. If the initial value of the flow control window may indicate the size of the packet that can be sent by the client in a period, the preset value is usually set to a size of a packet. The embodiments of this disclosure are described by using an example in which the initial value of the flow control window of the client indicates the quantity of the packets that can be sent by the client in a period.

In addition, the serving end and the client further set a recovery period of the window value of the flow control window, so that the serving end and the client may periodically set the window value of the flow control window to the initial value based on the recovery period through a timer apparatus. For example, a timer module may be set in the serving end and the client, to time the recovery period of the flow control window, and recover the flow control window to the initial value when the timing reaches a recovery period. A value of the recovery period may be set based on actual disclosure scenarios, for example, set to 10 s. If the recovery period is set to 10 s, and the initial value of the flow control window is 100, it may indicate that the serving end and the client can receive a maximum of 100 packets within 10 s.

Because the serving end usually communicates with a plurality of clients, and initial values and recovery periods of the flow control windows of the clients may be different, initial values and recovery periods of flow control windows that are of the serving end and that correspond to the clients may also be different, and the serving end may store a correspondence between the clients and the flow control windows of the clients. The client stores the flow control window of the client. The flow control window stored by the client is the same as a flow control window that is stored by the serving end and that is of the client. The client and the serving end both perform flow control on the client through the stored flow control window.

The serving end and the client may negotiate and update the initial value and the recovery period of the flow control window. For example, when setting up a connection, the serving end and the client may negotiate to determine the initial value of the flow control window and the recovery period of the flow control window through a packet setting up the connection. In a data transmission process, the serving end and the client may negotiate to update the initial value of the flow control window and the recovery period of the flow control window through a heartbeat message.

In this embodiment of this disclosure, the packet (for example, a connection request packet and a connection acknowledgment packet) setting up the connection and the heartbeat message may be expanded, so that a flow control parameter, for example, the initial value of the flow control window and the recovery period of the flow control window, used to negotiate or update is carried. For example, an attribute field of a variable header in each packet may be expanded, and a receive maximum attribute field may be added to store the initial value of the flow control window, and a traffic control period field may be added to store the recovery period of the flow control window.

A window threshold may further be set in the client and the serving end, and a value of the window threshold is usually less than the initial value of the flow control window. When sending a packet, if determining that the window value of the flow control window of the client is equal to the window threshold, the client needs to pause an operation of sending the packet, and perform the operation of sending the packet again after the window value recovers to the initial value, to implement traffic control of the client. When receiving the packet, if the window value that is stored by the serving end and that is of the flow control window of the client is equal to the window threshold, the serving end needs to reject the packet sent by the client, to implement traffic control of the client. The value of the window threshold is usually set to 0.

Figure 2:
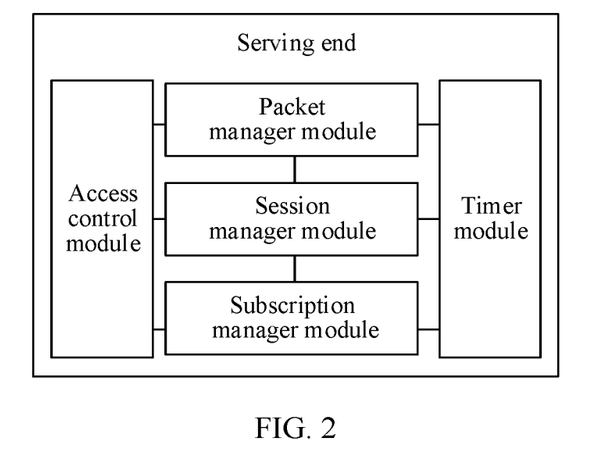
FIG. 2 is a schematic structural diagram of a serving end according to an embodiment of this disclosure.

The serving end may include a plurality of modules, for example, as shown in FIG. 2, an access control (ACL) module, a session manager module, a subscription manager module, a packet manager module, and a timer module, and the modules may communicate with each other. In this embodiment of this disclosure, a flow control service (FlowCtrl Service) function may be added to the session manager module, and functions of a publish service (PUBLISH Service), a connect service (CONNECT Service), a connection acknowledgment service (CONNACK Service), a heartbeat service (e.g., a PINGREQ Service and a PINGRESP Service) in the timer module and the packet manager module are enhanced, to implement the traffic control in this embodiment of this disclosure.

The ACL module is used for client access authentication and operation authentication, which include: when setting up a connection, the client and the serving end provide a user name password or certificate of the client, the ACL module performs authentication on the client, and the client stores a session of the client in the session manager module after the authentication succeeds; when the client performs an operation such as publication or subscription, the ACL module performs authentication on the operation, for example, the ACL module needs to check whether the client has a permission for accessing (e.g., reading and writing) a subject of the publication or subscription; if there is no permission, the ACL module rejects the operation, and otherwise, converts to a corresponding module to perform the processing operation; and information such as a parameter of a message, a session, and the client is persisted through a persistence module in the ACL module.

The timer module is configured to implement a timing task of the serving end, for example, perform a timing task on a heartbeat parameter (e.g., keepalive) and a timeout parameter (e.g., timeout) of the session of the client, and perform a recycle operation on a released resource. In this embodiment of this disclosure, the timer module may further include an operation of timely recovering the initial value of the window value in the FlowCtrl Service, to ensure that the message is normally sent and received between the serving end and the client, thereby achieving an objective of flow control.

The session manager module is responsible for managing the session of the client. For example, when the client is reconnected to the serving end after being disconnected from the serving end, provided that the session of the client stored by the session manager module is in a validity period, the session manager module may recover the subscription of the client based on the session of the client, and deliver a new message to the client in a disconnection period. The FlowCtrl Service in the session manager module is used as an interface of a flow control mechanism, and may store a flow control parameter (for example, an initial value of each flow control window and a recovery period of each flow control window) and real-time timing data (for example, each window value) of the flow control parameter. The session service in the session manager module is used to create a connection instance with the client, store a connection parameter, a real-time variable, a message linked list, and the like.

The subscription manager module is responsible for processing a subscription request of the client, and storing the subscription request of each client as a subscription tree, to set up a connection relationship between the session of the client and the packet, so that when publishing the packet, the packet may be matched with a specific client through the subscription tree, facilitating sending the packet to the specified client.

The packet manager module is configured to: process the packet received by the serving end, analyze the packet, parse a type of the packet based on the MQTT protocol, and perform corresponding processing. A packet of a connect (CONNECT) type, a publish-in (PUBLISH-IN) type, or a ping (PING) type is processed.

After receiving the connection request packet sent by the client, the serving end invokes a session management interface, sets up the session instance, and is used to store the connection between the client and the serving end. In this embodiment of this disclosure, a receive maximum attribute field is added to a variable header of the connection request packet, to carry the initial value of the flow control window, and a traffic control period field is added to carry the recovery period of the flow control window.

After receiving the publish packet from the client, the serving end forwards, based on the subscription tree, the publish packet to a client subscribing the message. In this embodiment of this disclosure, each time the serving end accesses a publish packet, the FlowCtrl Service may be invoked to decrease the window value that is stored by the serving end and that is of the flow control window of the client by a preset value. In addition, when receiving a publish packet, if determining that the window value of the flow control window of the client is equal to the window threshold, the serving end rejects the publish packet of the client, and when the timing in the timer module reaches a recovery period, the serving end recovers to receive the publish packet of the client after the window value of the flow control window of the client is recovered.

The serving end receives a heartbeat request packet (e.g., PINGREQ) from the client, and then needs to reply to a heartbeat response message (e.g., PINGRESP), to maintain a connection between the serving end and the client. The heartbeat request packet and the heartbeat response message may be collectively referred to as a heartbeat message. In this embodiment of this disclosure, the serving end and the client may add an attribute field to the heartbeat message, to negotiate between the serving end and the client, or exchange the initial value of the flow control window of the client and the recovery period of the flow control window of the client. For example, the receive maximum attribute field is added to the variable header of the connection heartbeat message, to carry the initial value of the flow control window of the client, and the traffic control period field is added to carry the recovery period of the flow control window of the client.

The serving end replies to, through the connection acknowledgment packet, the connection request initiated by the client. In this embodiment of this disclosure, the attribute field may be added to the variable packet of the connection acknowledgment packet, to negotiate between the serving end and the client, or exchange the initial value of the flow control window of the client and the recovery period of the flow control window of the client. For example, the receive maximum attribute field is added to the variable header of the connection acknowledgment packet, to carry the initial value of the flow control window of the client, and the traffic control period field is added to carry the recovery period of the flow control window of the client.

Figure 3:
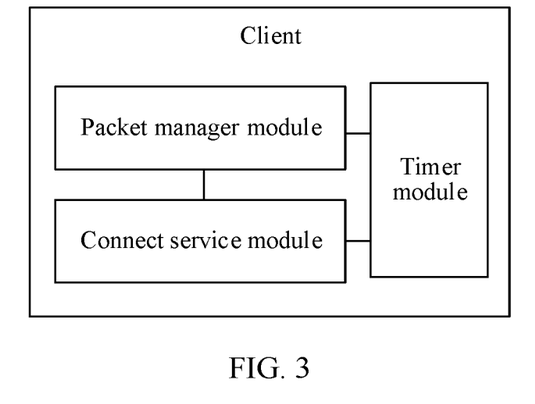
FIG. 3 is a schematic structural diagram of a client according to an embodiment of this disclosure.

The client may include a plurality of modules. For example, as shown in FIG. 3, the client may include a connect service module, a packet manager module, and a timer module. In this embodiment of this disclosure, a flow control service function may be added, and functions of a publish service, a heartbeat request service (e.g., PINGREQ Service), and a heartbeat response service (e.g., PINGRESP Service) in the timer module, a connect service module, and a packet manager module are enhanced, to implement the traffic control in this embodiment of this disclosure.

The connect service module is used by the client to request to set up a connection, to the serving end. In this embodiment of this disclosure, an attribute field may be added to a variable packet of the connection request packet, to negotiate between the serving end and the client, or exchange the initial value of the flow control window of the client and the recovery period of the flow control window of the client. For example, a receive maximum attribute field is added to the variable header of the connection request packet, to carry the initial value of the flow control window of the client, and a traffic control period field is added to carry the recovery period of the flow control window of the client.

The timer module is configured to: perform a timing task of the client, and send a heartbeat message timely, to maintain a connection between the client and the serving end. In this embodiment of this disclosure, the timer module needs to timely recover the flow control window to the initial value of the flow control window based on the recovery period of the flow control window of the client. The heartbeat service (e.g., PINGREQ Service and PINGRESP Service) in the timer module are used to maintain the connection between the client and the serving end through the heartbeat message, and may further be used to negotiate, by the serving end and the client based on a requirement, to update the initial value of the flow control window of the client and the recovery period of the flow control window of the client. For example, the receive maximum attribute field is added to the variable header of the connection heartbeat message, to carry the initial value of the flow control window of the client, and the traffic control period field is added to carry the recovery period of the flow control window of the client.

For the publish service function in the packet manager module, in this embodiment of this disclosure, when publishing a message to the serving end, the client needs to check whether a window value of the flow control window of the client is greater than a window threshold each time before publishing a packet. If the window value of the flow control window of the client is greater than the window threshold, the window value is decreased by a preset value and the packet is sent; and otherwise, the client pauses sending the packet, and when timing in the timer module reaches a recovery period, the client sends the packet again after the window value recovers to the initial value.

Figure 4:
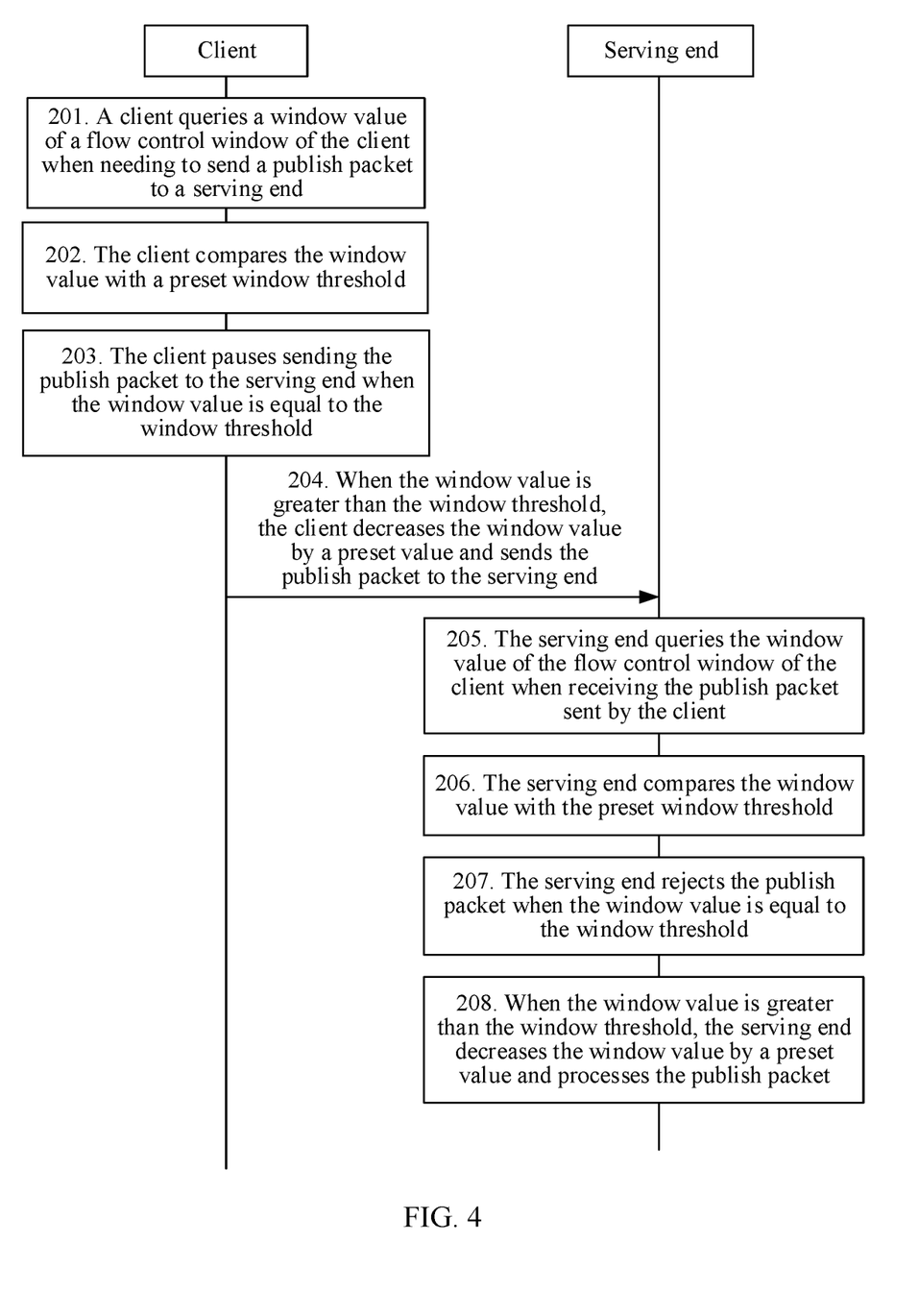
FIG. 4 is a schematic flowchart of a traffic control method according to an embodiment of this disclosure.

An embodiment of this disclosure provides a traffic control method, which may be used in the network architecture shown in FIG. 1. As shown in FIG. 4, the method includes the following operations.

201. A client queries a window value of a flow control window of the client when needing to send a publish packet to a serving end.

The client stores the window value of the flow control window of the client. When sending the publish packet to the serving end, the client needs to determine whether the publish packet can be sent by the client at this moment, to be specific, needs to compare the window value of the flow control window of the client with a preset window threshold, to determine whether the client can send the publish packet at this moment. Therefore, the window value of the flow control window of the client needs to be queried. The window value of the flow control window of the client may be an initial value, or a window value after being adjusted based on a situation of sending the publish packet.

202. The client compares the window value with the preset window threshold.

The client compares the window value of the flow control window of the client with the preset window threshold, to determine whether the publish packet can be sent to the serving end at this moment.

203. The client pauses sending the publish packet to the serving end when the window value is equal to the window threshold.

Through the comparison in operation 202, when it is determined that the window value of the flow control window of the client is equal to the window threshold, it may be determined that the client cannot send the publish packet to the serving end at this moment. Therefore, the client pauses sending the publish packet at this moment. The client may subsequently monitor the window value of the flow control window of the client in real time, and send the publish packet again after the window value of the flow control window of the client recovers to the initial value.

204. When the window value is greater than the window threshold, the client decreases the window value by a preset value, and sends the publish packet to the serving end.

Through the comparison in operation 202, when it is determined that the window value of the flow control window of the client is equal to the window threshold, it may be determined that the client can send the publish packet to the serving end at this moment. Therefore, the client can send the publish packet to the serving end at this moment. In addition, the client needs to decrease the window value of the flow control window of the client by a preset value, to accurately record a quantity of publish packets sent by the client to the serving end, so that a quantity of publish packets that can be sent by the client is accurately determined, to implement traffic control of the client.

205. The serving end queries the window value of the flow control window of the client when receiving the publish packet sent by the client.

The serving end stores the window value of the flow control window of each client.

The serving end needs to query the window value that is stored by a server and that is of the flow control window of the client when receiving the publish packet sent by the client, to determine whether the serving end can normally process the publish packet sent by the client at this time.

206. The serving end compares the window value with the preset window threshold.

The serving end compares the window value that is stored by the server and that is of the flow control window of the client with the preset window threshold, to determine whether the publish packet sent by the client can be received at this moment.

207. The serving end rejects the publish packet when the window value is equal to the window threshold.

Through the comparison in operation 206, when determining that the window value of the flow control window of the client is equal to the window threshold, the serving end may determine that the serving end cannot receive the publish packet sent by the client at this moment. Therefore, the serving end rejects the publish packet sent by the client at this moment. A manner in which the serving end rejects the publish packet may be discarding the received publish packet, or replying a message for rejecting the publish packet, to the client.

208. When the window value is greater than the window threshold, the serving end decreases the window value by a preset value and processes the publish packet.

Through the comparison in operation 206, when determining that the window value that is stored by the server and that is of the flow control window of the client is greater than the window threshold, the serving end may determine that the publish packet sent by the client can be received at this moment. Therefore, the serving end can process the publish packet at this moment. In addition, the serving end needs to decrease the window value of the flow control window of the client by a preset value, to accurately record a quantity of publish packets that may further be received and that are sent by the client, to implement traffic control of the client.

In this embodiment of this disclosure, the serving end and the client both store the window value of the flow control window of the client, the serving end controls, through the window value of the flow control window of the client, the quantity of the publish packets of the client that are received, and the client controls, through the window value of the flow control window of the client, the quantity of the publish packets sent to the serving end, to implement traffic control of the client. Therefore, in this embodiment of this disclosure, a problem that the serving end cannot process a packet in time because the client sends the packet too fast or the client sends an excessive quantity of packets can be avoided through the flow control of the client, so that communication can be normally performed between the client and the serving end.

In an implementation of this embodiment of this disclosure, because the serving end and the client need to store the window value of the flow control window of the client, the serving end and the client need to negotiate to determine the initial value of the flow control window of the client and a recovery period of the flow control window of the client. For example, the serving end and the client may determine the initial value of the flow control window of the client and the recovery period of the flow control window of the client through a connection setup process. Specific manners may be the following processes.

A. The client may send a connection request packet to the serving end, where the connection request packet includes a first initial value of the flow control window of the client and a first recovery period of the flow control window of the client.

When a connection is set up between the client and the serving end, the client sends the connection request packet to the serving end. The first recovery period indicates a period in which the flow control window of the client recovers to the first initial value. The first initial value and a value of the first recovery period may be preset, and a specific value may be determined based on an actual scenario.

B. After receiving the connection request packet sent by the client, the serving end may determine whether the first initial value and the first recovery period satisfy a preset condition. The serving end may preset an allowed range of the initial value and an allowed range of the recovery period, and the preset condition may be set to that the initial value and the recovery period are both in a corresponding allowed range. After receiving the connection request packet, the serving end determines whether the first initial value and the first recovery period are both in the corresponding allowed range, to determine whether the first initial value and the first recovery period satisfy the preset condition.

C. When determining that the first initial value and the first recovery period satisfy the preset condition, the serving end may determine that the first initial value may be used as the initial value of the flow control window of the client, and the first recovery period may be used as the recovery period of the flow control window of the client. Therefore, the first initial value and the first recovery period need to be stored, to implement subsequent traffic control of the client. In addition, the serving end sends a first connection acknowledgment packet to the client. The first connection acknowledgment packet includes the first initial value and the first recovery period. The first connection acknowledgment packet indicates that the initial value of the flow control window of the client is the first initial value, and the recovery period of the flow control window of the client is the first recovery period. The serving end sends the first connection acknowledgment packet to the client, to indicate that the serving end accepts that the initial value of the flow control window of the client is the first initial value, and the recovery period of the flow control window of the client is the first recovery period.

It should be noted that after storing the first initial value of the flow control window of the client and the first recovery period of the flow control window of the client, the serving end may record the recovery period of the flow control window of the client in a manner such as timing by a timer module in the serving end, so that the serving end may further set the window value of the flow control window of the client to the first initial value based on the first recovery period in a process of data transmission with the client.

D. When the first initial value and the first recovery period do not satisfy the preset condition, the serving end needs to determine the initial value and the recovery period that satisfy the preset condition again. To be specific, the serving end needs to determine a second initial value of the flow control window of the client and a second recovery period of the flow control window of the client, and the serving end needs to store the determined second initial value and the determined second recovery period, to implement the subsequent traffic control of the client. In addition, the serving end sends a second connection acknowledgment packet to the client, where the second connection acknowledgment packet includes a second initial value and a second recovery period. The second connection acknowledgment packet indicates that the initial value of the flow control window of the client is the second initial value, and the recovery period of the flow control window of the client is the second recovery period. The serving end sends the second connection acknowledgment packet to the client, to indicate that the serving end does not accept that the initial value of the flow control window of the client is the first initial value, and does not accept that the recovery period of the flow control window of the client is the first recovery period. In addition, the initial value that is determined by the serving end and that is of the flow control window of the client is the second initial value, and the recovery period of the flow control window of the client is the second recovery period.

It should be noted that after storing the second initial value of the flow control window of the client and the second recovery period of the flow control window of the client, the serving end may record the recovery period of the flow control window of the client as the second recovery period in the manner such as timing by the timer module in the serving end, so that the serving end may further set the window value of the flow control window of the client to the second initial value based on the second recovery period in the process of data transmission with the client.

E. For the client, when receiving the first connection acknowledgment packet sent by the serving end, the client may determine, based on the first initial value and the first recovery period included in the first connection acknowledgment packet, that the serving end accepts that the first initial value is the initial value of the flow control window of the client, and the first recovery period is the recovery period of the flow control window of the client. Therefore, the client determines the first initial value as the initial value of the flow control window of the client, and the first recovery period as the recovery period of the flow control window of the client. In addition, the client stores the first initial value and the first recovery period, to implement subsequent traffic control of the client.

It should be noted that after storing the first initial value of the flow control window of the client and the first recovery period of the flow control window of the client, the client may record the recovery period of the flow control window of the client in a manner such as timing by a timer module in the client, so that the client may further set the window value of the flow control window of the client to the first initial value based on the first recovery period in a process of data transmission with the serving end.

F. For the client, when receiving the second connection acknowledgment packet sent by the serving end, the client may determine, based on the second initial value and the second recovery period included in the second connection acknowledgment packet, that the serving end does not accept that the first initial value is the initial value of the flow control window of the client, and does not accept that the first recovery period is the recovery period of the flow control window of the client. In addition, the client determines, through the second connection acknowledgment packet, that the serving end determines the initial value of the flow control window of the client and the recovery period of the flow control window of the client again, that is, the second initial value and the second recovery period. Therefore, the client determines the second initial value as the initial value of the flow control window of the client, and the second recovery period as the recovery period of the flow control window of the client. In addition, the client stores the second initial value and the second recovery period, to implement subsequent traffic control of the client.

It should be noted that after storing the second initial value of the flow control window of the client and the second recovery period of the flow control window of the client, the client may record the recovery period of the flow control window of the client in a manner such as timing by a timer module in the client, so that the client may further set the window value of the flow control window of the client to the second initial value based on the second recovery period in a process of data transmission with the serving end.

In this embodiment of this disclosure, in the foregoing process, the client and the serving end determine the initial value of the flow control window of the client and the recovery period of the flow control window of the client in a connection setup process, so that the window value of the flow control window of the client can be determined in the data transmission process, facilitating implementing traffic control of the client.

In another implementation of this embodiment of this disclosure, in a process of performing data transmission by the client and the serving end, due to reasons such as a network state change, a transport data amount change, and the like, the client needs to update the initial value of the flow control window and the recovery period of the flow control window. In this case, the client and the serving end update the initial value of the flow control window and the recovery period of the flow control window through a heartbeat message.

For example, in the foregoing implementation, after process E, the client and the serving end determine the first initial value as the initial value of the flow control window of the client, and the first recovery period as the recovery period of the flow control window of the client. When the initial value of the flow control window and the recovery period of the flow control window need to be subsequently updated, the following processes may be performed. The client sends a first heartbeat message to the serving end, where the first heartbeat message includes a third initial value of the flow control window of the client and a third recovery period of the flow control window of the client, the third initial value is used to update the first initial value, and the third recovery period is used to update the first recovery period; and when the third initial value and the third recovery period satisfy a preset condition, the serving end stores the third initial value and the third recovery period, and sends a second heartbeat message to the client, where the second heartbeat message includes the third initial value and the third recovery period; when the third initial value and the third recovery period do not satisfy the preset condition, the serving end determines a fourth initial value and a fourth recovery period, and sends a third heartbeat message to the client, where the third heartbeat message includes a fourth initial value and a fourth recovery period; and when receiving the second heartbeat message including the third initial value and the third recovery period, the client updates the first initial value based on the third initial value and updates the first recovery period based on the third recovery period, and the second heartbeat message is sent when the serving end accepts the third initial value and the third recovery period; when receiving the third heartbeat message including a fourth initial value and a fourth recovery period, the client updates the first initial value based on the fourth initial value and updates the first recovery period based on the fourth recovery period, where the third heartbeat message is sent when the serving end does not accept the third initial value and the third recovery period.

After determining the third initial value that is used to update the first initial value and the third recovery period that is used to update the first recovery period, the client needs to negotiate with the serving end to start up the third initial value and the third recovery period. Therefore, the client sends the third initial value and the third recovery period to the serving end through the first heartbeat message.

After receiving the first heartbeat message, the serving end determines whether the third initial value and the third recovery period satisfy the preset condition. If the third initial value and the third recovery period satisfy the preset condition, the serving end accepts the third initial value and the third recovery period and stores the third initial value and the third recovery period, to update the first initial value and the first recovery period. To be specific, the initial value of the flow control window of the client is updated to the third initial value, and the recovery period of the flow control window of the client is updated to the third recovery period. In addition, if the third initial value and the third recovery period satisfy the preset condition, the serving end sends the second heartbeat message to the client, where the second heartbeat message includes the third initial value and the third recovery period, to instruct the client to update the first initial value by using the third initial value, and update the first recovery period by using the third recovery period. If the third initial value and the third recovery period do not satisfy the preset condition, the serving end does not accept the third initial value and the third recovery period, needs to determine the fourth initial value and the fourth recovery period that satisfy the preset condition, and then stores the fourth initial value and the fourth recovery period, facilitating updating the first initial value and the first recovery period. To be specific, the initial value of the flow control window of the client is updated to the fourth initial value, and the recovery period of the flow control window of the client is updated to the fourth recovery period. In addition, if the third initial value and the third recovery period do not satisfy the preset condition, the serving end sends the third heartbeat message to the client, where the third heartbeat message includes the fourth initial value and the fourth recovery period, to instruct the client to update the first initial value by using the fourth initial value, and update the first recovery period by using the fourth recovery period.

After sending the first heartbeat message, the client receives a feedback of the serving end. If receiving the second heartbeat message including the third initial value and the third recovery period, the client may determine that the serving end accepts the third initial value to update the first initial value and accepts the third recovery period to update the first recovery period. In this way, the client may update the first initial value based on the third initial value and update the first recovery period based on the third recovery period. To be specific, the initial value of the flow control window of the client is updated to the third initial value, and the recovery period of the flow control window of the client is updated to the third recovery period. If receiving the second heartbeat message including the fourth initial value and the fourth recovery period, the client may determine that the serving end does not accept the third initial value to update the first initial value and does not accept the third recovery period to update the first recovery period, determines the fourth initial value to update the first initial value, and determines the fourth recovery period to update the first recovery period. In this way, the client may update the first initial value based on the fourth initial value and update the first recovery period based on the fourth recovery period. To be specific, the initial value of the flow control window of the client is updated to the fourth initial value, and the recovery period of the flow control window of the client is updated to the fourth recovery period.

For another example, in the foregoing implementation, after step F, the client and the serving end determine the second initial value as the initial value of the flow control window of the client, and the second recovery period as the recovery period of the flow control window of the client. When the initial value of the flow control window and the recovery period of the flow control window need to be subsequently updated, the following processes may be performed. The client sends the first heartbeat message to the serving end, where the first heartbeat message includes a fifth initial value of the flow control window of the client and a fifth recovery period of the flow control window of the client, the fifth initial value is used to update the second initial value, and the fifth recovery period is used to update the second recovery period; when the fifth initial value and the fifth recovery period satisfy the preset condition, the serving end stores the fifth initial value and the fifth recovery period, and sends the second heartbeat message to the client, where the second heartbeat message includes the fifth initial value and the fifth recovery period; when the fifth initial value and the fifth recovery period do not satisfy the preset condition, the serving end determines a sixth initial value and a sixth recovery period, and sends the third heartbeat message to the client, where the third heartbeat message includes the sixth initial value and the sixth recovery period; when receiving the second heartbeat message including the fifth initial value and the fifth recovery period, the client updates the second initial value based on the fifth initial value and updates the second recovery period based on the fifth recovery period, and the second heartbeat message is sent when the serving end accepts the fifth initial value and the fifth recovery period; and when receiving the third heartbeat message including the sixth initial value and the sixth recovery period, the client updates the second initial value based on the sixth initial value and updates the second recovery period based on the sixth recovery period, where the second heartbeat message is sent when the serving end accepts the fifth initial value and the fifth recovery period.

After determining the fifth initial value that is used to update the first initial value and the fifth recovery period that is used to update the first recovery period, the client needs to negotiate with the serving end to start up the fifth initial value and the fifth recovery period. Therefore, the client sends the fifth initial value and the fifth recovery period to the serving end through the first heartbeat message.

After receiving the first heartbeat message, the serving end determines whether the fifth initial value and the fifth recovery period satisfy the preset condition. If the fifth initial value and the fifth recovery period satisfy the preset condition, the serving end accepts the fifth initial value and the fifth recovery period and stores the fifth initial value and the fifth recovery period, to update the second initial value and the second recovery period. To be specific, the initial value of the flow control window of the client is updated to the fifth initial value, and the recovery period of the flow control window of the client is updated to the fifth recovery period. In addition, if the fifth initial value and the fifth recovery period satisfy the preset condition, the serving end sends the second heartbeat message to the client, where the second heartbeat message includes the fifth initial value and the fifth recovery period, to instruct the client to update the second initial value by using the fifth initial value, and update the second recovery period by using the fifth recovery period. If the fifth initial value and the fifth recovery period do not satisfy the preset condition, the serving end does not accept the fifth initial value and the fifth recovery period, needs to determine the sixth initial value and the sixth recovery period that satisfy the preset condition, and then stores the sixth initial value and the sixth recovery period, facilitating updating the second initial value and the second recovery period. To be specific, the initial value of the flow control window of the client is updated to the sixth initial value, and the recovery period of the flow control window of the client is updated to the sixth recovery period. In addition, if the fifth initial value and the fifth recovery period do not satisfy the preset condition, the serving end sends the third heartbeat message to the client, where the third heartbeat message includes the sixth initial value and the sixth recovery period, to instruct the client to update the second initial value by using the sixth initial value, and update the second recovery period by using the sixth recovery period.

After sending the first heartbeat message, the client receives the feedback of the serving end. If receiving the second heartbeat message including the fifth initial value and the fifth recovery period, the client may determine that the serving end accepts the fifth initial value to update the second initial value and accepts the fifth recovery period to update the second recovery period. In this way, the client may update the second initial value based on the fifth initial value and update the second recovery period based on the fifth recovery period. To be specific, the initial value of the flow control window of the client is updated to the fifth initial value, and the recovery period of the flow control window of the client is updated to the fifth recovery period. If receiving the third heartbeat message including the sixth initial value and the sixth recovery period, the client may determine that the serving end does not accept the fifth initial value to update the second initial value and does not accept the fifth recovery period to update the second recovery period, determines the sixth initial value to update the second initial value, and determines the sixth recovery period to update the second recovery period. In this way, the client may update the second initial value based on the sixth initial value and update the second recovery period based on the sixth recovery period. To be specific, the initial value of the flow control window of the client is updated to the sixth initial value, and the recovery period of the flow control window of the client is updated to the sixth recovery period.

In this embodiment of this disclosure, the serving end and the client may update the initial value of the flow control window and the recovery period of the flow control window through the heartbeat message, so that the serving end and the client may adjust the flow control window of the client in real time, further ensuring reasonableness of flow control of the client.

Figure 5:
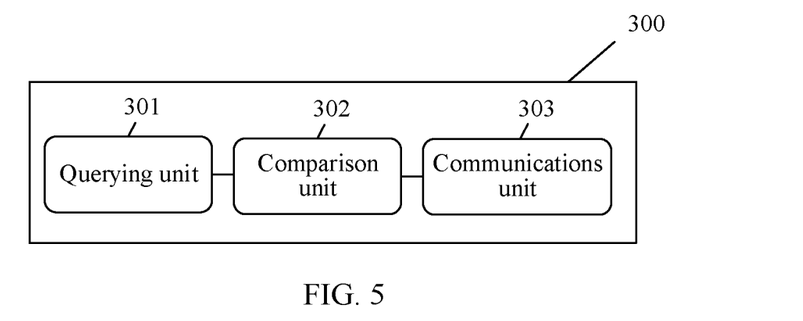
FIG. 5 is a schematic block diagram of a traffic control apparatus according to an embodiment of this disclosure.

FIG. 5 is a schematic block diagram of a traffic control apparatus 300 according to an embodiment of this disclosure. The apparatus 300 is a serving end, for example, an MQTT serving end 101. As shown in FIG. 5, the traffic control apparatus 300 includes:

a querying unit 301, configured to query a window value of a flow control window of a client when receiving a publish packet sent by the client;

a comparison unit 302, configured to compare the window value with a preset window threshold; and a communications unit 303, configured to: reject the publish packet when the window value is equal to the window threshold; or when the window value is greater than the window threshold, decrease the window value by a preset value, and process the publish packet.

In this embodiment of this disclosure, the apparatus 300 stores the window value of the flow control window of the client. The apparatus 300 may control, through the window value of the flow control window of the client, receiving the publish packet sent by the client, to implement traffic control of the client. Therefore, a problem that the apparatus 300 cannot process a packet in time because the client sends the packet too fast or the client sends an excessive quantity of packets can be avoided, so that communication can be normally performed between the client and the apparatus 300.

Figure 6:
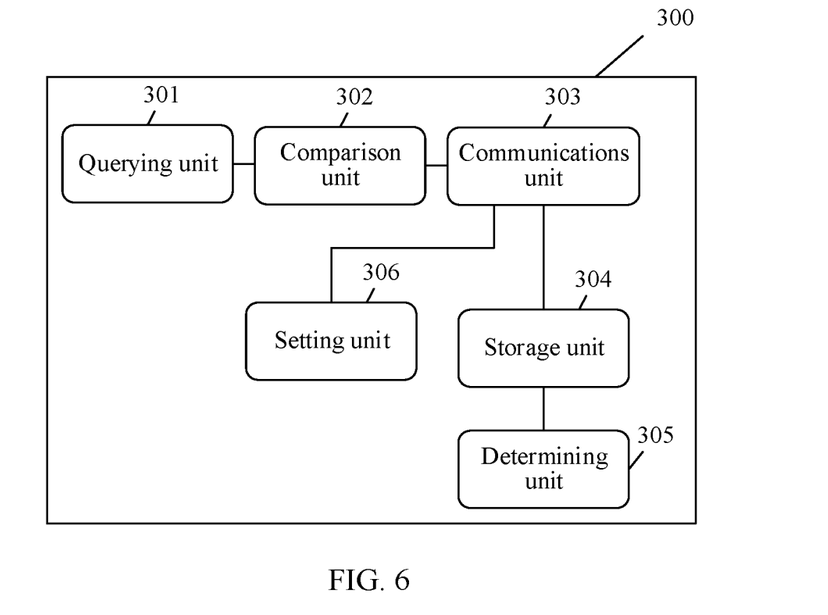
FIG. 6 is a schematic block diagram of another traffic control apparatus according to an embodiment of this disclosure.

FIG. 6 is a schematic block diagram of another traffic control apparatus 300 according to an embodiment of this disclosure.

It may be understood that the communications unit 303 is further configured to receive a connection request packet sent by the client, where the connection request packet includes a first initial value of the flow control window of the client and a first recovery period of the flow control window of the client, and the first recovery period indicates a period in which the flow control window of the client recovers to the first initial value; and as shown in FIG. 6, the apparatus 300 may further include:

a storage unit 304, configured to store the first initial value and the first recovery period when the first initial value and the first recovery period satisfy a preset condition;

the communications unit 303, further configured to send a first connection acknowledgment packet to the client, where the first connection acknowledgment packet includes the first initial value and the first recovery period, the first connection acknowledgment packet indicates that an initial value of the flow control window of the client is the first initial value, and a recovery period of the flow control window of the client is the first recovery period; and as shown in FIG. 6, the apparatus 300 may further include:

a determining unit 305, configured to determine a second initial value of the flow control window of the client and a second recovery period of the flow control window of the client when the first initial value and the first recovery period do not satisfy the preset condition;

the storage unit 304, further configured to store the second initial value and the second recovery period; and the communications unit 303, further configured to send a second connection acknowledgment packet to the client, where the second connection acknowledgment packet includes the second initial value and the second recovery period, the second connection acknowledgment packet indicates that the initial value of the flow control window of the client is the second initial value, and the recovery period of the flow control window of the client is the second recovery period.

It may be understood that as shown in FIG. 6, the apparatus 300 may further include:

a setting unit 306, configured to set a value of the flow control window of the client to the first initial value based on the first recovery period.

It may be understood that the communications unit 303 is further configured to receive a first heartbeat message sent by the client, where the first heartbeat message includes a third initial value of the flow control window of the client and a third recovery period of the flow control window of the client, the third initial value is used to update the first initial value, and the third recovery period is used to update the first recovery period;

the storage unit 304 is further configured to store the third initial value and the third recovery period when the third initial value and the third recovery period satisfy the preset condition;

the communications unit 303 is further configured to send a second heartbeat message to the client, where the second heartbeat message includes the third initial value and the third recovery period;

the determining unit 305 is further configured to determine a fourth initial value and a fourth recovery period when the third initial value and the third recovery period do not satisfy the preset condition; and the communications unit 303 is further configured to send a third heartbeat message to the client, where the third heartbeat message includes the fourth initial value and the fourth recovery period.

It may be understood that the setting unit 306 is configured to set a value of the flow control window of the client to the second initial value based on the second recovery period.

The traffic control apparatus 300 according to this embodiment of this disclosure may correspond to an execution body of the traffic control method according to the embodiments of this disclosure, and modules in the traffic control apparatus 300 are respectively for implementing corresponding procedures performed by the serving end in the method shown in FIG. 4. For brevity, details are not described herein again.

Figure 7:
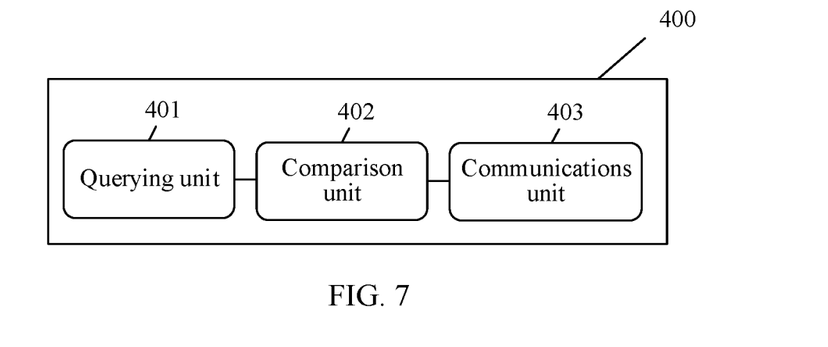
FIG. 7 is a schematic block diagram of still another traffic control apparatus according to an embodiment of this disclosure.

FIG. 7 is a schematic block diagram of still another traffic control apparatus 400 according to an embodiment of this disclosure. The apparatus 400 is a client, for example, any one of a sensor 103, a sensor 104, a sensor 105, and an Internet of Things terminal 106. As shown in FIG. 7, the traffic control apparatus 400 includes:

a querying unit 401, configured to query a window value of a flow control window of the client when needing to send a publish packet to a serving end;

a comparison unit 402, configured to compare the window value with a preset window threshold; and a communications unit 403, configured to: pause sending the publish packet to the serving end when the window value is equal to the window threshold; or when the window value is greater than the window threshold, decrease the window value by a preset value, and send the publish packet to the serving end.

In this embodiment of this disclosure, the apparatus 400 stores the window value of the flow control window of the apparatus 400 and may control, through the window value, whether to send the publish packet to the serving end, to implement traffic control of the apparatus 400. Therefore, a problem that the serving end cannot process a packet in time because the apparatus 400 sends the packet too fast or the apparatus 400 sends an excessive quantity of packets can be avoided, so that communication can be normally performed between the apparatus 400 and the serving end.

Figure 8:
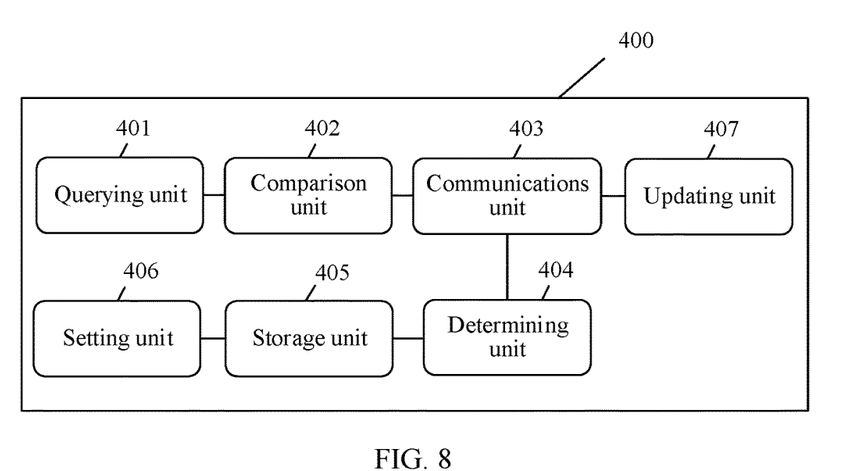
FIG. 8 is a schematic block diagram of yet another traffic control apparatus according to an embodiment of this disclosure.

FIG. 8 is a schematic block diagram of yet another traffic control apparatus 400 according to an embodiment of this disclosure.

It may be understood that the communications unit 403 is further configured to send a connection request packet to the serving end, where the connection request packet includes a first initial value of the flow control window of the client and a first recovery period of the flow control window of the client, and the first recovery period indicates a period in which the flow control window of the client recovers to the first initial value;

the communications unit 403 is further configured to receive a first connection acknowledgment packet sent by the serving end, where the first connection acknowledgment packet includes the first initial value and the first recovery period, the first connection acknowledgment packet indicates that an initial value of the flow control window of the client is the first initial value, and a recovery period of the flow control window of the client is the first recovery period; and as shown in FIG. 8, the apparatus 400 may further include:

a determining unit 404, configured to determine the first initial value as the initial value of the flow control window of the client, and the first recovery period as the recovery period of the flow control window of the client; and a storage unit 405, configured to store the first initial value and the first recovery period.

It may be understood that as shown in FIG. 8, the apparatus 400 may further include:

a setting unit 406, configured to set a value of the flow control window of the client to the first initial value based on the first recovery period.

It may be understood that the communications unit 403 is further configured to send a first heartbeat message to the serving end, where the first heartbeat message includes a third initial value of the flow control window of the client and a third recovery period of the flow control window of the client, the third initial value is used to update the first initial value, and the third recovery period is used to update the first recovery period; and as shown in FIG. 8, the apparatus 400 may further include:

an updating unit 407, configured to: when receiving a second heartbeat message including the third initial value and the third recovery period, update the first initial value based on the third initial value, and update the first recovery period based on the third recovery period, where the second heartbeat message is sent when the serving end accepts the third initial value and the third recovery period; and the updating unit 407, further configured to: when receiving a third heartbeat message including a fourth initial value and a fourth recovery period, update the first initial value based on the fourth initial value, and update the first recovery period based on the fourth recovery period, where the third heartbeat message is sent when the serving end does not accept the third initial value and the third recovery period.

It may be understood that the communications unit 403 is further configured to send a connection request packet to the serving end, where the connection request packet includes a first initial value of the flow control window of the client and a first recovery period of the flow control window of the client, and the first recovery period indicates a period in which the flow control window of the client recovers to the first initial value;

the communications unit 403 is further configured to receive a second connection acknowledgment packet sent by the serving end, where the second connection acknowledgment packet includes a second initial value and a second recovery period, the second connection acknowledgment packet indicates that an initial value of the flow control window of the client is the second initial value, and a recovery period of the flow control window of the client is the second recovery period; and as shown in FIG. 8, the apparatus 400 may further include:

the determining unit 404, configured to determine the second initial value as the initial value of the flow control window of the client, and the second recovery period as the recovery period of the flow control window of the client; and the storage unit 405, configured to store the second initial value and the second recovery period.

It may be understood that as shown in FIG. 8, the apparatus 400 may further include:

a setting unit 406, configured to set a value of the flow control window of the client to the second initial value based on the second recovery period.

The traffic control apparatus 400 according to this embodiment of this disclosure may correspond to an execution body of the traffic control method according to the embodiments of this disclosure, and modules in the traffic control apparatus 400 are respectively for implementing corresponding procedures performed by the client in the method shown in FIG. 4. For brevity, details are not described herein again.

Figure 9:
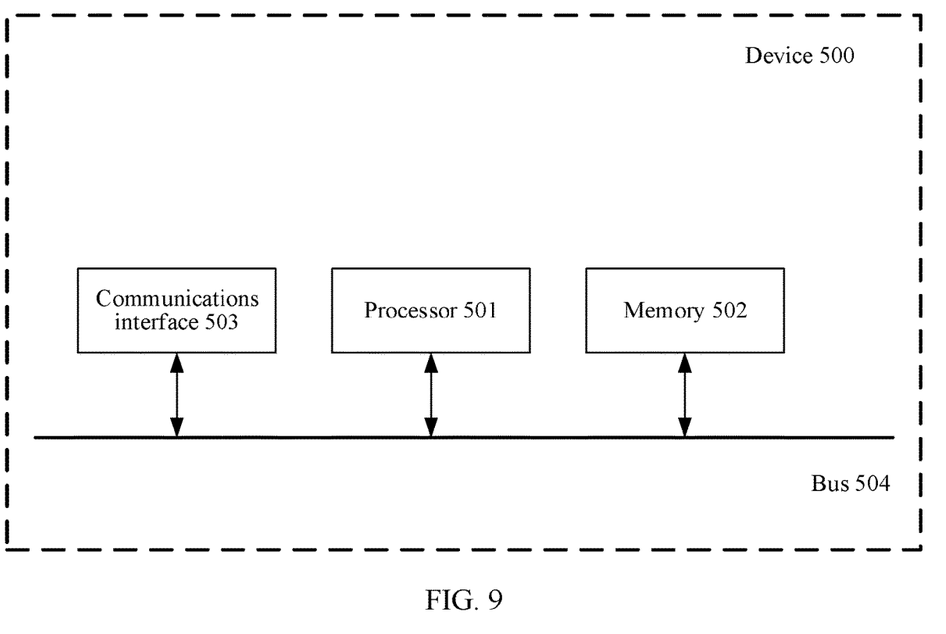
FIG. 9 is a schematic block diagram of a traffic control device according to an embodiment of this disclosure.

FIG. 9 is a schematic block diagram of a traffic control device 500 according to an embodiment of this disclosure. As shown in FIG. 9, the device 500 includes a processor 501, a memory 502, and a communications interface 503. The communications interface 503 is configured to communicate with an external device.

The processor 501 may include a central processing unit (CPU), a network processor (NP), or a combination thereof. The processor 501 may further include a hardware chip, for example, an disclosure-specific integrated circuit (ASIC), a programmable logic device (PLD), or a combination thereof. The PLD may be a complex programmable logic device (CPLD), a field-programmable gate array (FPGA), a generic array logic (GAL), or a combination thereof. Circuits in the processor 501 may be independent, or may be integrated into one or more chips.

The memory 502 may be an independent component, or may be integrated in the processor 501. The memory 502 may include a volatile memory (volatile memory), such as a random access memory (random-access memory, RAM). The memory 502 may also include a non-volatile memory, such as a flash memory, a hard disk drive (HDD), or a solid-state drive (SSD). The memory 502 may further include any combination of the foregoing memories.

The memory 502 may be configured to store an initial value of each flow control window and a recovery period of each flow control window. Optionally, the memory 502 is further configured to store a computer program instruction, and the processor 501 executes the computer program instruction stored in the memory 502, to implement the method shown in FIG. 4.

The communications interface 503 may be a wireless interface, or a wired interface. The wireless interface may be a cellular mobile network interface, a wireless local area network (WLAN) interface, or the like. The wired interface may be an Ethernet interface, for example, an optical interface or an electrical interface.

The device 500 may further include a bus 504. The bus 504 is configured to connect to the process 501, the memory 502, and the communications interface 503, so that the processor 501, the memory 502, and the communications interface 503 communicate with each other through the bus 504.

In an implementation, the memory 502 is configured to store program code, and the processor 501 is configured to invoke the program code, to implement functions and steps that are performed rather by the serving end in FIG. 4.

In another implementation, the memory 502 is configured to store program code, and the processor 501 is configured to invoke the program code, to implement functions and steps that are performed by the client in FIG. 4.

An embodiment of this disclosure further provides a traffic control system, including the traffic control apparatus 300 shown in FIG. 5 or FIG. 6, and the traffic control apparatus 400 shown in FIG. 7 or FIG. 8.

All or some of the foregoing embodiments may be implemented by means of software, hardware, or a combination thereof. When the software is used to implement the embodiments, the embodiments may be all or partially implemented in a form of a computer program product. The computer program product includes one or more computer instructions. When the computer program instructions are loaded and executed on a computer, the procedure or functions according to the embodiments of this disclosure are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, a twisted pair, an optical fiber) or wireless (for example, infrared, radio, microwave, or the like) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

In the foregoing specification, the invention has been described in reference to specific exemplary embodiments thereof. It will, however, be evident that various modifications and changes may be made thereto without departing from the described spirit and scope of the invention. The specification and drawings are, accordingly, to be regarded as illustrative rather than a restrictive sense.

What is claimed is:

1. A traffic control method, comprising:
    querying, by a serving end, a window value of a flow control window of a client when receiving a publish packet sent by the client;
    comparing, by the serving end, the window value with a preset window threshold;
    when the window value is less than or equal to the window threshold, rejecting, by the serving end, the publish packet; and
    when the window value is greater than the window threshold, decreasing, by the serving end, the window value by a preset value, and processing the publish packet;
    wherein the window value of the flow control window comprises an initial value of a quantity of publish packets that can be received by the serving end within a preset period from the client, or a value adjusted based on a quantity of publish packets received from the client, or
    wherein the window value of the flow control window comprises an initial value of a size of publish packets that can be received by the serving end within a preset period from the client, or a value adjusted based on a size of publish packets received from the client.

2. The method according to claim 1, further comprising:
receiving, by the serving end, a connection request packet sent by the client, wherein the connection request packet comprises a first initial value of the flow control window of the client and a first recovery period of the flow control window of the client, and the first recovery period indicates a period in which the flow control window of the client recovers to the first initial value;
when the first initial value and the first recovery period satisfy a preset condition, storing, by the serving end, the first initial value and the first recovery period, and sending a first connection acknowledgment packet to the client, wherein the first connection acknowledgment packet comprises the first initial value and the first recovery period, the first connection acknowledgment packet indicates that an initial value of the flow control window of the client is the first initial value, and a recovery period of the flow control window of the client is the first recovery period; and
when the first initial value and the first recovery period do not satisfy the preset condition:
determining, by the serving end, a second initial value of the flow control window of the client and a second recovery period of the flow control window of the client,
storing, by the serving end, the second initial value and the second recovery period, and
sending, by the serving end, a second connection acknowledgment packet to the client, wherein the second connection acknowledgment packet comprises the second initial value and the second recovery period, the second connection acknowledgment packet indicates that the initial value of the flow control window of the client is the second initial value, and the recovery period of the flow control window of the client is the second recovery period.

3. The method according to claim 2, wherein after the sending, by the serving end, the first connection acknowledgment packet to the client, the method further comprises:
setting, by the serving end, a value of the flow control window of the client to the first initial value based on the first recovery period.

4. The method according to claim 2, further comprising:
receiving, by the serving end, a first heartbeat message sent by the client, wherein the first heartbeat message comprises a third initial value of the flow control window of the client and a third recovery period of the flow control window of the client, the third initial value is used to update the first initial value, and the third recovery period is used to update the first recovery period;
when the third initial value and the third recovery period satisfy the preset condition, storing, by the serving end, the third initial value and the third recovery period, and sending a second heartbeat message to the client, wherein the second heartbeat message comprises the third initial value and the third recovery period; and
when the third initial value and the third recovery period do not satisfy the preset condition, determining, by the serving end, a fourth initial value and a fourth recovery period, and sending a third heartbeat message to the client, wherein the third heartbeat message comprises the fourth initial value and the fourth recovery period.

5. The method according to claim 2, wherein after the sending, by the serving end, the second connection acknowledgment packet to the client, the method further comprises:
setting, by the serving end, a value of the flow control window of the client to the second initial value based on the second recovery period.

6. A traffic control method, comprising:
querying, by a client, a window value of a flow control window of the client for sending a publish packet to a serving end;
comparing, by the client, the window value with a preset window threshold;
when the window value is less than or equal to the window threshold, pausing, by the client, sending the publish packet to the serving end; and
when the window value is greater than the window threshold, decreasing, by the client, the window value by a preset value, and sending the publish packet to the serving end;
wherein the window value of the flow control window comprises an initial value of a quantity of publish packets that can be sent to the serving end within a preset period by the client, or a value adjusted based on a quantity of publish packets sent to the serving end, or
wherein the window value of the flow control window comprises an initial value of a size of publish packets that can be sent to the serving end within a preset period by the client, or a value adjusted based on a size of publish packets sent to the serving end.

7. The method according to claim 6, further comprising:
sending, by the client, a connection request packet to the serving end, wherein the connection request packet comprises a first initial value of the flow control window of the client and a first recovery period of the flow control window of the client, and the first recovery period indicates a period in which the flow control window of the client recovers to the first initial value;
receiving, by the client, a first connection acknowledgment packet sent by the serving end, wherein the first connection acknowledgment packet comprises the first initial value and the first recovery period, the first connection acknowledgment packet indicates that an initial value of the flow control window of the client is the first initial value, and a recovery period of the flow control window of the client is the first recovery period;
determining, by the client, the first initial value as the initial value of the flow control window of the client, and the first recovery period as the recovery period of the flow control window of the client; and
storing, by the client, the first initial value and the first recovery period.

8. The method according to claim 7, wherein after the storing, by the client, the first initial value and the first recovery period, the method further comprises:
setting, by the client, a value of the flow control window of the client to the first initial value based on the first recovery period.

9. The method according to claim 7, further comprising:
sending, by the client, a first heartbeat message to the serving end, wherein the first heartbeat message comprises a third initial value of the flow control window of the client and a third recovery period of the flow control window of the client, the third initial value is used to update the first initial value, and the third recovery period is used to update the first recovery period;

when receiving a second heartbeat message comprising the third initial value and the third recovery period, updating, by the client, the first initial value based on the third initial value, and updating the first recovery period based on the third recovery period, wherein the second heartbeat message is sent when the serving end accepts the third initial value and the third recovery period; and when receiving a third heartbeat message comprising a fourth initial value and a fourth recovery period, updating, by the client, the first initial value based on the fourth initial value, and updating the first recovery period based on the fourth recovery period, wherein the third heartbeat message is sent when the serving end does not accept the third initial value and the third recovery period.

10. The method according to claim 6, further comprising:

sending, by the client, a connection request packet to the serving end, wherein the connection request packet comprises a first initial value of the flow control window of the client and a first recovery period of the flow control window of the client, and the first recovery period indicates a period in which the flow control window of the client recovers to the first initial value;

receiving, by the client, a second connection acknowledgment packet sent by the serving end, wherein the second connection acknowledgment packet comprises a second initial value and a second recovery period, the second connection acknowledgment packet indicates that an initial value of the flow control window of the client is the second initial value, and a recovery period of the flow control window of the client is the second recovery period;

determining, by the client, the second initial value as the initial value of the flow control window of the client, and the second recovery period as the recovery period of the flow control window of the client; and storing, by the client, the second initial value and the second recovery period.

11. The method according to claim 10, wherein after the storing, by the client, the second initial value and the second recovery period, the method further comprises:

setting, by the client, a value of the flow control window of the client to the second initial value based on the second recovery period.

12. A traffic control apparatus being a serving end, and the traffic control apparatus comprises:

a first memory storing instructions; and a processor coupled with the first memory to execute the instructions to:

query a window value of a flow control window of a client when receiving a publish packet sent by the client;

compare the window value with a preset window threshold; and when the window value is less than or equal to the window threshold, reject the publish packet, and when the window value is greater than the window threshold, decrease the window value by a preset value, and process the publish packet, wherein the window value of the flow control window comprises an initial value of a quantity of publish packets that can be received by the serving end within a preset period from the client, or a value adjusted based on a quantity of publish packets received from the client, or wherein the window value of the flow control window comprises an initial value of a size of publish packets that can be received by the serving end within a preset period from the client, or a value adjusted based on a size of publish packets received from the client.

13. The apparatus according to claim 12, wherein the traffic control apparatus further comprises a second memory, and the processor executes the instructions to:

receive a connection request packet sent by the client, wherein the connection request packet comprises a first initial value of the flow control window of the client and a first recovery period of the flow control window of the client, and the first recovery period indicates a period in which the flow control window of the client recovers to the first initial value; and when the first initial value and the first recovery period satisfy a preset condition, send a first connection acknowledgment packet to the client, wherein the first connection acknowledgment packet comprises the first initial value and the first recovery period, the first connection acknowledgment packet indicates that an initial value of the flow control window of the client is the first initial value, and a recovery period of the flow control window of the client is the first recovery period; and when the first initial value and the first recovery period do not satisfy the preset condition, determine a second initial value of the flow control window of the client and a second recovery period of the flow control window of the client, and send a second connection acknowledgment packet to the client, wherein the second connection acknowledgment packet comprises the second initial value and the second recovery period, the second connection acknowledgment packet indicates that the initial value of the flow control window of the client is the second initial value, and the recovery period of the flow control window of the client is the second recovery period; and wherein the second memory stores the first initial value and the first recovery period when the first initial value and the first recovery period satisfy a preset condition, or stores the second initial value and the second recovery period.

14. The apparatus according to claim 13, wherein the processor executes the instructions to:

set a value of the flow control window of the client to the first initial value based on the first recovery period.

15. The apparatus according to claim 13, wherein the processor executes the instructions to:

receive a first heartbeat message sent by the client, wherein the first heartbeat message comprises a third initial value of the flow control window of the client and a third recovery period of the flow control window of the client, the third initial value is used to update the first initial value, and the third recovery period is used to update the first recovery period;

when the third initial value and the third recovery period satisfy the preset condition, send a second heartbeat message to the client, wherein the second heartbeat message comprises the third initial value and the third recovery period;

when the third initial value and the third recovery period do not satisfy the preset condition, determine a fourth initial value and a fourth recovery period, and send a third heartbeat message to the client, wherein the third heartbeat message comprises the fourth initial value and the fourth recovery period; and the second memory is configured to store the third initial value and the third recovery period when the third initial value and the third recovery period satisfy the preset condition, or store the fourth initial value and the fourth recovery period.

16. The apparatus according to claim 13, the processor executes the instructions to:

set a value of the flow control window of the client to the second initial value based on the second recovery period.

17. A traffic control apparatus being a client, and the traffic control apparatus comprises:

a first memory storing instructions; and a processor coupled with the first memory to execute the instructions to:

query a window value of a flow control window of the client for sending a publish packet to a serving end, compare the window value with a preset window threshold, when the window value is less than or equal to the window threshold, pause sending the publish packet to the serving end; and when the window value is greater than the window threshold, decrease the window value by a preset value, and send the publish packet to the serving end, wherein the window value of the flow control window comprises an initial value of a quantity of publish packets that can be sent to the serving end within a preset period by the client, or a value adjusted based on a quantity of publish packets sent to the serving end, or wherein the window value of the flow control window comprises an initial value of a size of publish packets that can be sent to the serving end within a preset period by the client, or a value adjusted based on a size of publish packets sent to the serving end.

18. The apparatus according to claim 17, wherein the traffic control apparatus further comprises a second memory, and the processor executes the instructions to:

send a connection request packet to the serving end, wherein the connection request packet comprises a first initial value of the flow control window of the client and a first recovery period of the flow control window of the client, and the first recovery period indicates a period in which the flow control window of the client recovers to the first initial value;

receive a first connection acknowledgment packet sent by the serving end, wherein the first connection acknowledgment packet comprises the first initial value and the first recovery period, the first connection acknowledgment packet indicates that an initial value of the flow control window of the client is the first initial value, and a recovery period of the flow control window of the client is the first recovery period; and determine the first initial value as the initial value of the flow control window of the client, and the first recovery period as the recovery period of the flow control window of the client;

wherein the second memory stores the first initial value and the first recovery period.

19. The apparatus according to claim 18, wherein the processor executes the instructions to:

set a value of the flow control window of the client to the first initial value based on the first recovery period.

20. The apparatus according to claim 18, wherein the processor executes the instructions to:

send a first heartbeat message to the serving end, wherein the first heartbeat message comprises a third initial value of the flow control window of the client and a third recovery period of the flow control window of the client, the third initial value is used to update the first initial value, and the third recovery period is used to update the first recovery period;

when receiving a second heartbeat message comprising the third initial value and the third recovery period, update the first initial value based on the third initial value, and update the first recovery period based on the third recovery period, wherein the second heartbeat message is sent when the serving end accepts the third initial value and the third recovery period; and when receiving a third heartbeat message comprising a fourth initial value and a fourth recovery period, update the first initial value based on the fourth initial value, and update the first recovery period based on the fourth recovery period, wherein the third heartbeat message is sent when the serving end does not accept the third initial value and the third recovery period.

* * * * *